CODE CONVERTER CIRCUIT

Original Filed Nov. 22, 1954

INVENTOR.
BYRON L. HAVENS
BY Wesley De Bruin
ATTORNEY

July 25, 1961 B. L. HAVENS 2,994,076

CODE CONVERTER CIRCUIT

Original Filed Nov. 22, 1954 2 Sheets-Sheet 2

INVENTOR.
BYRON L. HAVENS
BY Wesley De Bruin
ATTORNEY

United States Patent Office 2,994,076

Patented July 25, 1961

2,994,076

CODE CONVERTER CIRCUIT

Byron L. Havens, Closter, N.J., assignor to International Business Machines Corporation, New York, N.Y., a corporation of New York Original application Nov. 22, 1954, Ser. No. 470,160. Divided and this application Apr. 11, 1958, Ser. No. 727,875

1 Claim. (Cl. 340—347)

This application is a division of my copending application Serial Number 470,160, filed November 22, 1954, and entitled "Electronic Multiplier-Divider."

This invention relates to electronic circuits and more particularly to high speed electronic code converter circuits having particular utility in multiplying and dividing circuits of the novel type disclosed and claimed in the above identified parent U.S. Patent application.

The orders of a binary number, reading from right to left, correspond in value to $2^0$, $2^1$, $2^2$, $2^3$, $2^4$, etc., or decimal digits, 1, 2, 4, 8 16 respectively. The presence of a binary 1 represented by a pulse, indicates the presence of a decimal digit corresponding thereto, and the presence of binary 0, represented by the absence of a pulse, indicates the absence of that decimal digit. The binary number 1001 therefore represents the sum of the decimal digits 1 and 8 or the decimal digit 9.

In the binary decimal system each decimal digit is represented in the pure binary notation. For example, 459 is written in the written binary system as 0100,0101,1001

The decimal digit 9 occupying the first digit position is written as 1001 where the binary orders, from right to left, represent 1, 2, 4 and 8, respectively. The decimal digit 5 occupying the second digit position is written as 0101 where the binary orders from right to left, represent 10, 20, 40 and 80, respectively. The decimal digit 4 occupying the third digit position is written as 0100 where the binary orders, from right to left represent 100, 200, 400 and 800, respectively. In the practice of the invention any decimal digit is represented by four binary orders. A binary 1 or binary 0 occupying these orders, from right to left, are designated as a 1 bit, 2 bit, 4 bit and 8 bit, respectively.

It is a frequent practice to effect over and over addition of the multiplicand to derive the product or to add certain multiples of the multiplicand different from those designated by the actual digits of the multiplier and then perform corrective operations to produce the correct product. These multiplication systems are disadvantageous in that an excessive number of machine cycles are required to produce a product and extra operations as required to produce the correct product. A frequent practice employed by dividers is to effect over and over subtraction of the divisor from the dividend or subtraction of certain multiples of the divisor from the dividend. The former practice is disadvantageous in that an excessive number of machine cycles are required to produce the quotient. The latter practice is disadvantageous in that it requires extra operations to provide the correct quotient digits and the correct remainder.

A principal object of the invention of the parent application is to provide an improved electronic multiplier and an improved electronic divider which eliminates the above disadvantages.

A principal object of this invention is to provide high speed electronic code converter circuits having particular utility in multiplying and dividing circuits of the novel type disclosed and claimed in the above identified parent U.S. patent application.

Another object of this invention is to provide a novel binary to decimal converter for converting representations expressed in the binary notation into a single decimal representation of corresponding value.

Another object of this invention is to provide a novel electronic circuit which receives information in the binary notation and provides a first voltage from each input terminal in response to the presence of a binary 1, and a second voltage in response to the presence of a binary 0, and selectively applies these voltages to coincidence circuits corresponding to the decimal digits one through nine, to provide an UP voltage only at the output of the coincidence circuit corresponding to the decimal digit represented in the binary notations.

Another object of this invention is to provide a novel coincidence circuit means for providing an output representing a multiple corresponding in decimal value to the decimal representation of one input.

A further object of this invention is to provide a novel circuit arrangement for converting a value represented in the decimal system to the same value represented in the binary notation.

A further object of this invention is to provide a novel circuit arrangement for converting, one at a time, digits represented in the decimal system to representations in the binary decimal system.

Another object of this invention is to provide a novel circuit for converting individual representations in a first coded system into the corresponding representations in a second coded system.

A still further object of this invention is to provide a high speed electronic decimal to Binary-Decimal Converter that is highly reliable in operation and employs a minimum number of components.

A still further object of this invention is to provide a high speed electronic Binary to Decimal Converter that is highly reliable in operation and employs a minimum number of components.

Other objects of the invention will be pointed out in the following description and claims and illustrated in the accompanying drawings, which disclose, by way of example, the principle of the invention and best mode, which has been contemplated, of applying that principle.

DEFINITIONS

The following terms are defined to facilitate an understanding of their use herein.

An "Up" voltage present at a designated circuit point is the more positive of the two voltages which may be present at the circuit point.

A "Down" voltage present at a designated point is the less positive of the two voltages which may be present at the circuit point.

"Binary Character" refers to a binary 1 or a binary 0.

"Bit" refers to a possible representation in the binary or binary decimal system without regard to the presence or absence of the representation.

BINARY TO DECIMAL CONVERTER

Figures 1, 1A:
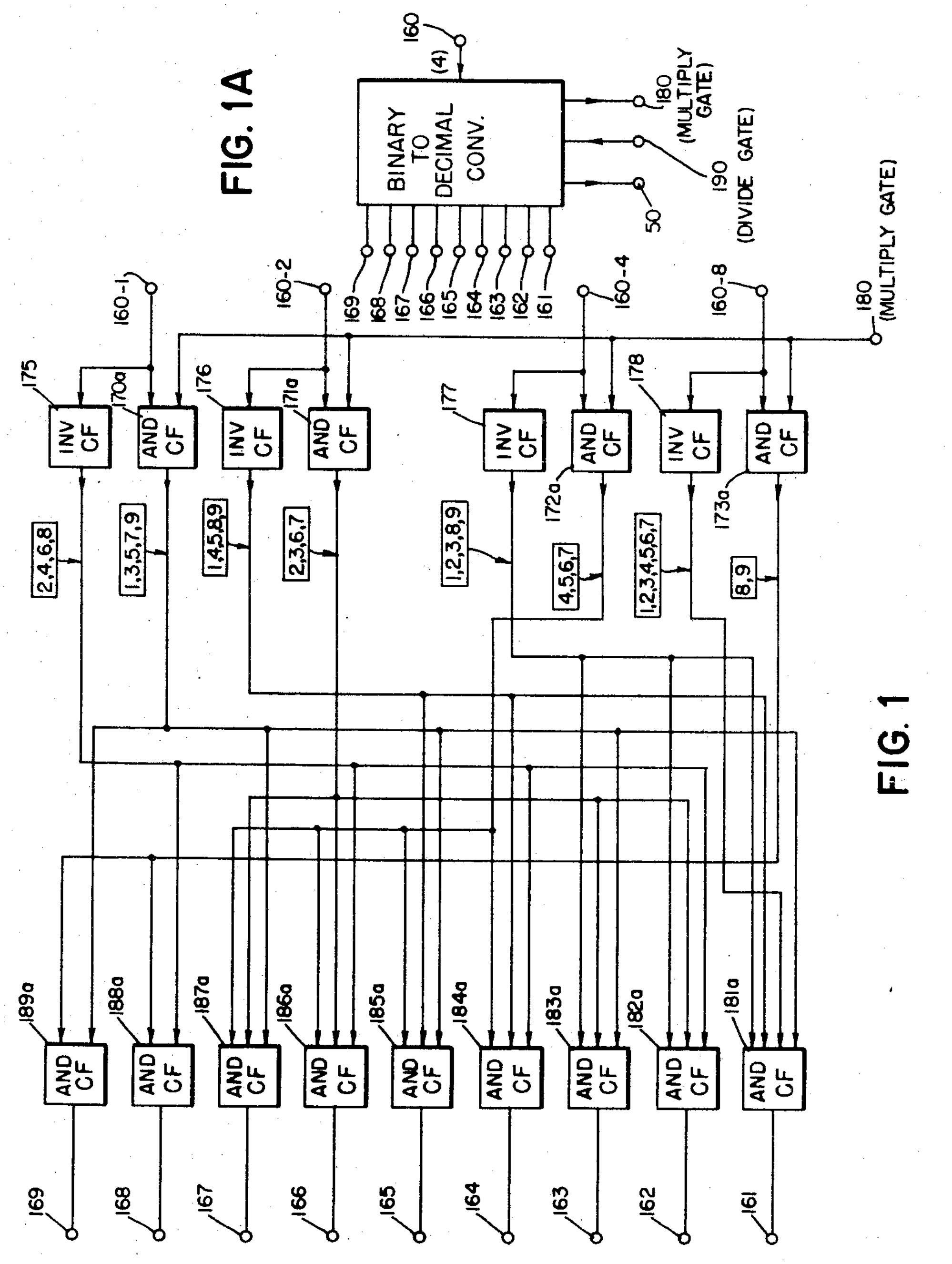
FIG. 1 is a diagram of the novel Binary to Decimal Converter.
FIG. 1A is a block diagram of the Binary to Decimal Converter of FIG. 1.

The binary to decimal converter shown in FIG. 1 receives a decimal digit expressed in the binary notation in accordance with the binary-decimal system and converts the binary-decimal representations to a representation corresponding to the decimal digit.

The input terminals 160—1, 160—2, 160—4 and 160—8 receive information corresponding to the 1 bit, 2 bit, 4 bit and 8 bit, respectively. Information expressed in the binary-decimal system is applied to these input terminals a decimal digit at a time. The output terminals 161, 162, 163, 164, 165, 166, 167, 168 and 169 correspond to the decimal digits 1, 2, 3, 4, 5, 6, 7, 8 and 9, respectively. Hence, if the binary decimal representations applied to the input terminals 160 represent the decimal number 6 the output terminal 166 is caused to go Up. The input terminals 160—1, 160—2, 160—4 and 160—8 are connected to the upper input of AND circuits 170*a*, 171*a*, 172*a* and 173*a*, respectively, and to the inverters 175, 176, 177 and 178, respectively. The lower input of each of the two input AND circuits 170*a*, 171*a*, 172*a* and 173*a* is commonly connected to a terminal 180. It is apparent that the AND circuits 170*a*, 171*a*, 172*a* and 173*a* are operative only when the terminal 180 is Up. One principal use of the binary to decimal converter, shown in FIGURE 1, is in the novel high speed electronic multiplication-division system disclosed and claimed in the Byron L. Havens U.S. patent application Serial No. 470,160, filed November 22, 1954, entitled, "Electronic Multiplier-Divider," of common assignee with the instant application. Hence, the terminal 180 is termed the multiply gate terminal and is Up during an entire multiplication operation of the novel type set forth in the above-identified (parent) U.S. patent application.

The outputs of the AND circuits 170*a*, 171*a*, 172*a*, and 173*a* and the inverters 175, 176, 177 and 178 are connected as shown in FIG. 1 to the inputs of the AND circuits 181*a*, 182*a*, 183*a*, 184*a*, 185*a*, 186*a*, 187*a*, 188*a* and 189*a*. The outputs of AND circuits 181*a* through 189*a* are connected respectively to the output terminals 161, 162, 163, 164, 165, 166, 167, 168 and 169.

The operation of the circuit of FIG. 1 is undertaken by conjoint reference to FIG. 1 and Table III below.

*Table III*

| Binary-decimal system | Decimal System | Input Terminals | | | |
|---|---|---|---|---|---|
| | | 160-1 | 160-2 | 160-4 | 160-8 |
| 0001 | 1 | U | D | D | D |
| 0010 | 2 | D | U | D | D |
| 0011 | 3 | U | U | D | D |
| 0100 | 4 | D | D | U | D |
| 0101 | 5 | U | D | U | D |
| 0110 | 6 | D | U | U | D |
| 0111 | 7 | U | U | U | D |
| 1000 | 8 | D | D | D | U |
| 1001 | 9 | U | D | D | U |

In Table III the binary-decimal representation of the decimal digits 1 through 9 are correlated with the voltage condition at the input terminals 160—1, 160—2, 160—4 and 160—8. A "U" indicates that the particular input terminal designated is Up and a "D" indicates that the particular input terminal is Down. If, for example, a 4 (0100) is to be applied to the input terminals of the converter, then the input terminal 160—4 is Up and the remaining input terminals are Down.

It is understood from reference to Table III that a binary 1 is present in the decimal digits 1, 3, 5, 7 and 9. This means that the terminal 160—1 will be Up when a binary decimal representation of any one of these decimal digits is applied to the input terminals. Hence, the output of AND circuit 170*a* is Up when the digits 1, 3, 5, 7 and 9 are present. Such is indicated by the inclosure of the digits 1, 3, 5, 7 and 9 in a rectangle directed to this output. In a similar manner the Up condition of the various outputs is indicated in FIG. 1.

If an input terminal is Up the output of the inverter connected thereto will be Down and if the input terminal is Down the output of the inverter will be Up. Hence, the output of inverter 175 will be Up when any one of the digits 2, 4, 6 or 8 is present. Such is indicated by the inclosure of these digits in a rectangle referred to the output of inverter 175.

An examination of the connections to the inputs of AND circuits 181*a* through 189*a* shows that only one of the output terminals is Up at any one time and that the terminal that is Up is representative of the value applied to the input terminals 160. The inputs to the AND circuits 181*a* through 189*a* will be referred to as first, second, third and fourth inputs beginning with the topmost input as shown in the drawing.

The first input of AND circuit 181*a* is connected to the output of inverter 177 and is Up when any one of the digits 1, 2, 3, 8 or 9 is present. The second input is connected to the output of inverter 176 and is Up when any one of the digits 1, 4, 5, 8 or 9 is present. The third input of AND circuit 181*a* is connected to the output of inverter 178 and is Up when any one of the inputs 1, 2, 3, 4, 5, 6 or 7 is present. The fourth input of AND circuit 181*a* is connected to the output of AND circuit 170*a* and is Up when any one of the digits 1, 3, 5, 7 or 9 is present. For the output of AND circuit 181*a* to be Up and thereby indicate the presence of a decimal 1, all of its inputs must be Up. It is now obvious from the above that the only time all of the inputs to the AND circuit 181*a* are Up is when a decimal digit 1 is present. This is because the outputs of inverters 176, 177, and 178, and the output of AND circuit 170*a* connected to these respective inputs are all Up simultaneously only when a decimal 1 is present.

The first input of AND circuit 182*a* is connected to the output of inverter 177 which is Up when any one of the digits 1, 2, 3, 8 or 9 is present. The second input of AND circuit 182*a* is connected to the output of AND circuit 171*a* and is Up when any one of the digits 2, 3, 6 or 7 is present. The third input to AND circuit 182*a* is connected to the output of inverter 175 and is Up when any one of the digits 2, 4, 6 or 8 is present. The digit common to this recitation is 2. The output terminal 162 is, therefore, Up only when the decimal digit 2 is presented to the input terminals 160 in the binary-decimal system.

The first input of AND circuit 183*a* is connected to the output of inverter 177 which is Up when any one of the digits 1, 2, 3, 8 or 9 is present. The second input of AND circuit 183*a* is connected to the output of AND circuit 171*a* and is Up when any one of the digits 2, 3, 6 or 7 is present. The third input of AND circuit 183*a* is connected to the output of AND circuit 170*a* which is Up when any one of the digits 1, 3, 5, 7 or 9 is present. The digit common to this recitation is 3. The output terminal 163 is, therefore, Up only when a decimal 3 is present.

The first input of AND circuit 184*a* is connected to the output of AND circuit 172*a* which is Up when any one of the digits 4, 5, 6 or 7 is present. The second input of AND circuit 184*a* is connected to the output of inverter 176 which is Up when any one of the digits 1, 4, 5, 8 or 9 is present. The third input of AND circuit 184*a* is connected to the output of inverter 175 which is Up when any one of the digits 2, 4, 6 or 8 is present. The digit common to this recitation is 4. The output terminal 164 is, therefore, Up only when a decimal 4 is present.

The AND circuit 185*a* is connected to the output of AND circuit 172*a* which is Up when any one of the digits 4, 5, 6 or 7 is present. The second input of AND circuit 185*a* is connected to the output of inverter 176 which is Up when any one of the digits 1, 4, 5, 8 or 9 is present. The third input of AND circuit 185*a* is connected to the output of AND circuit 170*a* which is Up when any one of the digits 1, 3, 5, 7 or 9 is present. The digit common to this recitation is 5. The output terminal 165 is, therefore, Up only when a decimal 5 is present.

The first input of AND circuit 186*a* is connected to the output of AND circuit 172*a* which is Up when any one of the digits 4, 5, 6 or 7 is present. The second input of AND circuit 186a is connected to the output of AND circuit 171a which is Up when any one of the digits 2, 3, 6 or 7 is present. The third input of AND circuit 186a is connected to the output of inverter 175 which is Up when any one of the digits 2, 4, 6 or 8 is present. The digit common to this recitation is 6. The output terminal 166 is, therefore, Up only when a decimal 6 is present.

The first input of AND circuit 187a is connected to the output of AND circuit 172a which is Up when any one of the digits 4, 5, 6, or 7 is present. The second input of AND circuit 187a is connected to the output of AND circuit 171a which is Up when any one of the digits 2, 3, 6 or 7 is present. The third input of AND circuit 187a is connected to the output of AND circuit 170a which is Up when any one of the digits 1, 3, 5, 7 or 9 is present. The digit common to this recitation is 7. The output terminal 167 is, therefore, Up only when a decimal 7 is present.

The first input of AND circuit 188a is connected to the output of AND circuit 173a which is Up when either of the digits 8 or 9 is present. The second input of AND circuit 188a is connected to the output of inverter 175 which is Up when any one of the digits 2, 4, 6 or 8 is present. The digit common to this recitation is 8. The output terminal 168 is, therefore, Up only when a decimal 8 is present.

The first input of AND circuit 189a is connected to the output of AND circuit 173a which is Up when either an 8 or 9 is present. The second input of AND circuit 189a is connected to the output of AND circuit 170a which is Up when any one of the digits 1, 3, 5, 7 or 9 is present. The digit common to this recitation is 9. The output terminal 169 is, therefore, Up only when a decimal 9 is present.

It is now clear that when representations are applied to the input terminals 160 in the binary-decimal system that the decimal digit represented thereby is indicated at the one of the output terminals 160 through 169 corresponding thereto. Hence, representations in the binary notation are converted to decimal representations. During the conversion operation it is often necessary in accordance with the operation of the invention disclosed in the parent application that a certain one of the output terminals of the binary to decimal converters employed be Up. A cathode follower (FIG. 1H of parent application) is employed for this purpose. The voltage at a divide gate terminal 190 (FIG. 1A) is applied to the input terminal 45 of the cathode follower to cause this output terminal 50 (FIG. 1A) to go Up. This output terminal 50 is connected to the particular output terminal of the binary decimal converter (FIG. 1) which it is desired to place in the Up condition. In order that these connections may be shown, the binary to decimal converter is represented as in FIG. 1A in the parent application.

In FIG. 1A the single connection from the input terminals 160 represents the four leads shown in FIG. 1. Each of the output terminals 161 through 169 is shown individually. The divide gate terminal 190 is connected to the input terminal 45 (not shown) of the cathode follower (FIG. 1H of parent application). If the cathode follower is employed the output terminal 50 will be connected to a preselected one of the output terminals 161 through 169 for reasons stated in the parent application to cause that terminal to remain Up during a particular operation.

DECIMAL TO BINARY-DECIMAL CONVERTER

Figure 2A:
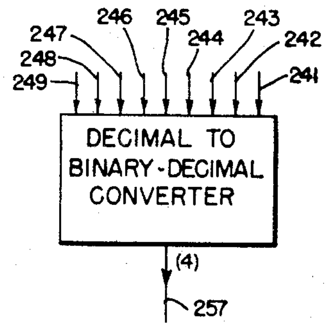
FIG. 2A is a block diagram of the Decimal to Binary-Decimal Converter of FIG. 2.
Figure 2:
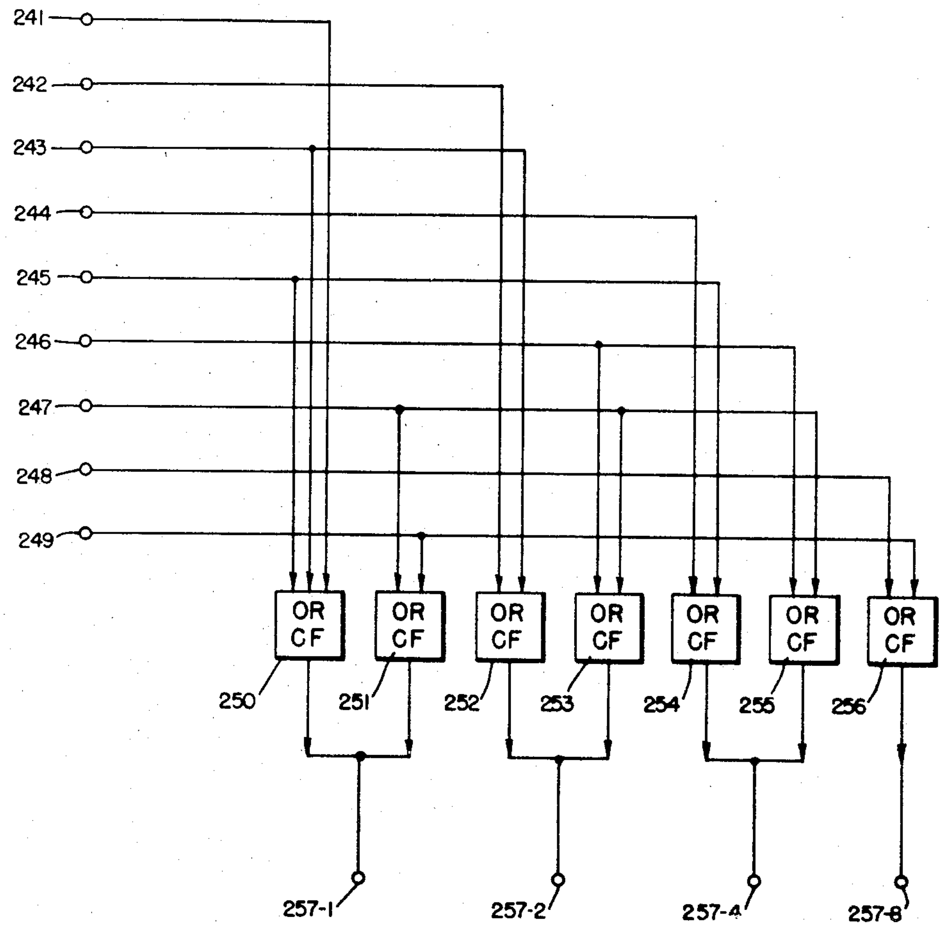
FIG. 2 is a diagram of the novel Decimal to Binary-Decimal Converter.

Referring to FIG. 2 the decimal to binary-decimal converter receives information in accordance with the decimal system at input terminals 241, 242, 243, 244, 245, 246, 247, 248 and 249 which represent the decimal digits 1 through 9. Hence, if a decimal 1 is present the terminal 241 is Up. As a further example, if decimal 6 is present terminal 246 is Up. Only a single one of the input terminals 241 through 249 is Up during any one time interval. The single input representing a decimal value is transferred through one or more of the OR circuits 250, 251, 252, 253, 254, 255 and 256 to the output terminals 257—1, 257—2, 257—4 and 257—8 where it is presented in the binary-decimal system. The outputs of the OR circuits 250 and 251 are commonly connected to the output terminal 257—1, the outputs of the OR circuits 252 and 253 are commonly connected to the output terminal 257—2, the outputs of OR circuits 254 and 255 are commonly connected to the output terminal 257—4 and the output of OR circuit 256 is connected to the output terminal 257—8.

Input terminal 241 is connected to one input of OR circuit 250. Input terminal 242 is connected to one input of OR circuit 252, input terminal 243 is connected to one input of each of the OR circuits 250 and 252, input terminal 244 is connected to one input of OR circuit 254, input terminal 245 is connected to one input of each of the OR circuits 250 and 254, input terminal 246 is connected to one input of each of the OR circuits 253 and 255, input terminal 247 is connected to one input of each of the OR circuits 251, 253 and 255, and input terminal 248 is connected to one input of OR circuit 256 and input terminal 249 is connected to one input of each of the OR circuits 251 and 256.

If an input of decimal 7 is applied the input terminal 247 is Up. This causes the corresponding inputs of OR circuits 251, 253 and 255 to go Up. Hence, the outputs of these OR circuits go Up. These outputs are connected respectively to the output terminals 257—1, 257—2, 257—4. Hence, output terminals 257—1, 257—2 and 257—4 are Up and output terminal 257—8 is Down. Hence, an output of 0111 is present, the equivalent of a decimal value of 7.

The operation of the decimal to binary-decimal converter may be more readily understood by reference to Table III hereinbefore and with particularity to the columns thereof labelled binary-decimal system and decimal system. Referring conjointly to Table III and FIG. 2, it is seen that the decimal value 1 is represented by 0001 in the binary-decimal system. Hence, if decimal 1 is present the output terminal 257—1 must go Up and the remaining outputs terminals must remain Down. This is accomplished by connecting the input terminal 241 through the Or circuit 250 to the output terminal 257—1. A decimal 3 is represented by 0011 in the binary-decimal system. This means that the output terminals 257—1 and 257—2 should go Up when the input terminal 243 goes Up and that the output terminals 257—4 and 257—8 should remain Down. This is accomplished by connecting the input terminal 243 to one input of each of the Or circuits 250 and 252. The output of the Or circuit 250 is connected directly to the output terminal 257—1 and the output of Or circuit 252 is connected directly to the output terminal 257—2. Hence, when input terminal 243 goes Up output terminals 257—1 and 257—2 go Up and output terminals 257—4 and 257—8 remain Down.

As a further example, decimal value 7 is represented by 0111 in the binary-decimal system. This means that when the input terminal 247 is Up the output terminals 257—1, 257—2 and 257—4 must go Up, and the output terminal 257—8 must remain Down. This is accomplished by connecting the input terminal 247 to one input of each of the Or circuits 251, 253 and 255 which are connected to the output terminals 257—1, 257—2 and 257—4, respectively.

The decimal to binary-decimal converter of FIG. 2 is shown in the parent application as indicated by the block diagram of FIG. 2A.

While there have been shown and described and pointed out the fundamental novel feature of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claim.

What is claimed is:

An electronic code converter for accepting an input electrical manifestation representative of a decimal value expressed in binary coded decimal notation and in less than one microsecond providing an output electrical manifestation representative of said decimal value expressed in decimal notation, said electronic code converter consisting in combination of: a group of binary coded decimal input terminals consisting of a 1 bit terminal, a 2 bit terminal, a 4 bit terminal, and an 8 bit terminal, for accepting said electrical manifestation representative of said decimal value expressed in binary coded decimal notation; a group of decimal output terminals consisting of a decimal value 1 terminal, a decimal value 2 terminal, a decimal value 3 terminal, a decimal value 4 terminal, a decimal value 5 terminal, a decimal value 6 terminal, a decimal value 7 terminal, a decimal value 8 terminal and a decimal value 9 terminal, for manifesting said electrical manifestation representative of said decimal value expressed in decimal notation; a gate terminal; a first Inverter circuit having an input and an output; a first AND circuit having first and second inputs and an output; a second Inverter circuit having an input and an output; a second AND circuit having first and second inputs and an output; a third Inverter circuit having an input and an output; a third AND circuit having first and second inputs and an output; a fourth Inverter circuit having an input and an output; a fourth AND circuit having first and second inputs and an output; a fifth AND circuit having first and second inputs and an output; a sixth AND circuit having first and second inputs and an output; a seventh AND circuit having first, second and third inputs and an output; an eighth AND circuit having first, second and third inputs and an output; a ninth AND circuit having first, second and third inputs and an output; a tenth AND circuit having first, second and third inputs and an output; an eleventh AND circuit having first, second and third inputs and an output; a twelfth AND circuit having first, second and third inputs and an output; a thirteenth AND circuit having first, second, third and fourth inputs and an output; first means directly connecting the input of said Inverter circuit and the first input of said first AND circuit to said 1 bit input terminal; second means directly connecting the input of said second Inverter circuit and the first input of said second AND circuit to said 2 bit input terminal; third means directly connecting the input of third Inverter circuit and the first input of said third AND circuit to said 4 bit input terminal; fourth means directly connecting the input of said fourth Inverter circuit and the first input of said fourth AND circuit to said 8 bit input terminal; fifth means directly connecting the second input of said first AND circuit, the second input of said second AND circuit, the second input of said third AND circuit and the second input of said fourth AND circuit to said gate terminal; sixth means directly connecting the output of said first Inverter to the second input of said sixth AND circuit, the third input of said eighth AND circuit, the third input of said tenth AND circuit, and the third input of said twelfth AND circuit; seventh means directly connecting the output of said first AND circuit to the second input of said fifth AND circuit, the third input of said seventh AND circuit, the third input of said ninth AND circuit, the third input of said eleventh AND circuit, and the fourth input of said thirteenth AND circuit; eighth means directly connecting the output of said second Inverter circuit to the second input of said ninth AND circuit, the second input of said tenth AND circuit, and the second input of said thirteenth AND circuit; ninth means directly connecting the output of said second AND circuit to the second input of said seventh AND circuit, to the second input of said eighth AND circuit, the second input of said eleventh AND circuit, and the second input of said twelfth AND circuit; tenth circuit means directly connecting the output of said third Inverter circuit to the first input of said eleventh AND circuit, the first input of said twelfth AND circuit, and the first input of said thirteenth AND circuit; eleventh circuit means directly connecting the output of said third AND circuit to the first input of said seventh AND circuit, the first input of said eighth AND circuit, the first input of said ninth AND circuit, and the first input of said tenth AND circuit; twelfth circuit means directly connecting the output of said fourth Inverter circuit to the third input of said thirteenth AND circuit; thirteenth circuit means directly connecting the output of said fourth AND circuit to said first input of said fifth AND circuit and said first input of said second AND circuit; and fourteenth circuit means respectively directly connecting, the output of said fifth AND circuit to said decimal value 9 output terminal, the output of said sixth AND circuit to said decimal value 8 output terminal, the output of said seventh AND circuit to said decimal value 7 output terminal, the output of said eighth AND circuit to said decimal value 6 output terminal, the output of said ninth AND circuit to said decimal value 5 output terminal, the output of said tenth AND circuit to said decimal value 4 output terminal, the output of said eleventh AND circuit to said decimal value 3 output terminal, the output of said twelfth AND circuit to said decimal value 2 output terminal, and the output of said thirteenth AND circuit to said decimal value 1 output terminal.

References Cited in the file of this patent

UNITED STATES PATENTS

| | | |
|---|---|---|
| 2,657,856 | Edwards | Nov. 3, 1953 |
| 2,745,093 | Holman et al. | May 8, 1956 |
| 2,792,174 | Rutter | May 14, 1957 |
| 2,798,667 | Spielberg et al. | July 9, 1957 |

OTHER REFERENCES

Lindsmith: A System for Counting and Recording Electrical Impulses in Printed Decimal Form, Proc. of the Asso. for Computing Machinery, May 1952, pp. 70, 71, 75.